J. C. RHODES, G. E. GUFFEY AND J. G. SHEEHAN.
BRAKE.
APPLICATION FILED JUNE 19, 1920.

1,372,549.

Patented Mar. 22, 1921.

J. C. Rhodes
G. E. Guffey
J. C. Sheehan
INVENTORS

BY *Victor J. Evans*
ATTORNEY

WITNESS:

UNITED STATES PATENT OFFICE.

JOSEPH C. RHODES, GEORGE E. GUFFEY, AND JAMES G. SHEEHAN, OF DANVILLE, KENTUCKY.

BRAKE.

1,372,549.  Specification of Letters Patent.  Patented Mar. 22, 1921.

Application filed June 19, 1920. Serial No. 390,138.

*To all whom it may concern:*

Be it known that we, JOSEPH C. RHODES, GEORGE E. GUFFEY, and JAMES G. SHEEHAN, citizens of the United States, residing at Danville, in the county of Boyle and State of Kentucky, have invented new and useful Improvements in Brakes, of which the following is a specification.

This invention relates to brakes for the steering wheels of automobiles and the like, the principal object of the invention being to provide means for braking either one or both of the steering wheels without interfering with the steering of the automobile.

The present invention is an improvement over that patented by us on June 3, 1919. No. 1,305,934.

The object of the present invention is to simplify the construction and cheapen the cost of manufacture as well as to make the entire mechanism more effective and efficient.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1:
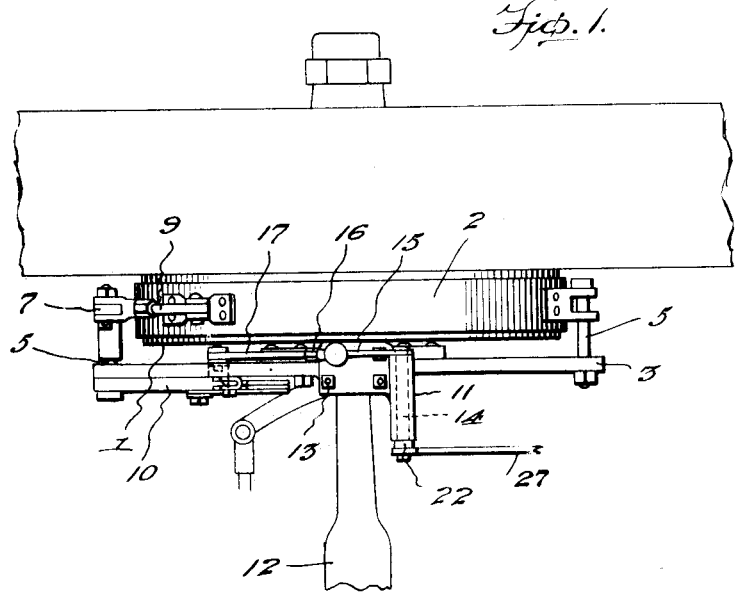
Figure 1 is a top plan view of one end of the front axle and its associated parts showing our invention applied to one of the steering wheels.

In these views 1 indicates a brake drum which is carried by the steering wheel and 2 indicates the brake band which encircles and is adapted to bear against the outer face of said drum. This band is carried by the cross piece 3 which is secured to or formed with the steering knuckle 4. This cross piece carries a pin 5 at each end thereof and a bracket 6, secured to the brake band opposite its split ends, engages one of said pins and the actuating plate 7 engages the other pin. This plate is connected with the brake band, adjacent its end shackles 8 and the links 9, the links having screw threaded engagement with the shackles so as to provide adjustment means. The pin which carries the plate 7 is formed or secured to an arm 10 so that as the arm is rocked, by means hereinafter to be described, the plate will be moved to expand or contract the brake band.

A housing 11 is secured to the forked end of the front axle 12 by the U-bolts 13 of said housing may be formed with said forked end. A shaft 14 is journaled in said housing. The crank 15 on the end of said shaft extends over the top of the steering knuckle and its outer end has pivoted thereto the socket member 16. This socket member receives the spherical end of the rod 17 which is connected with the arm 10 by the knuckle joint 18. The part 19 of this joint has a screw threaded bore to receive the screw threaded end of rod 17 and these parts are locked together by the nut 20. The part 21 of the joint is pivoted to the arm 10. The inner end of shaft 14 is provided with a crank 22 to which the link 23 is connected. said link leading to the brake applying means of the automobile so that when the brakes of the rear wheels are applied those of the front wheel will also be applied. As will be seen when the parts are in a position to apply the brakes the socket member 16 will be directly over the steering knuckle 4 so that the brake parts will not interfere with the proper steering of the automobile.

It will thus be seen that the front wheels may be braked as well as the rear wheels and the brake mechanism of the front wheels is so arranged as not to interfere with the steering of the automobile. The parts are adjustably connected together so that the brake band may be adjusted to compensate for wear. Where the invention is to be applied to cars already manufactured the parts are secured in place by bolts and the like but where the invention is to be applied to cars in the course of manufacture we prefer to form the cross bar 3 and the shaft housing 11 with the knuckle and shaft.

Figure 2:
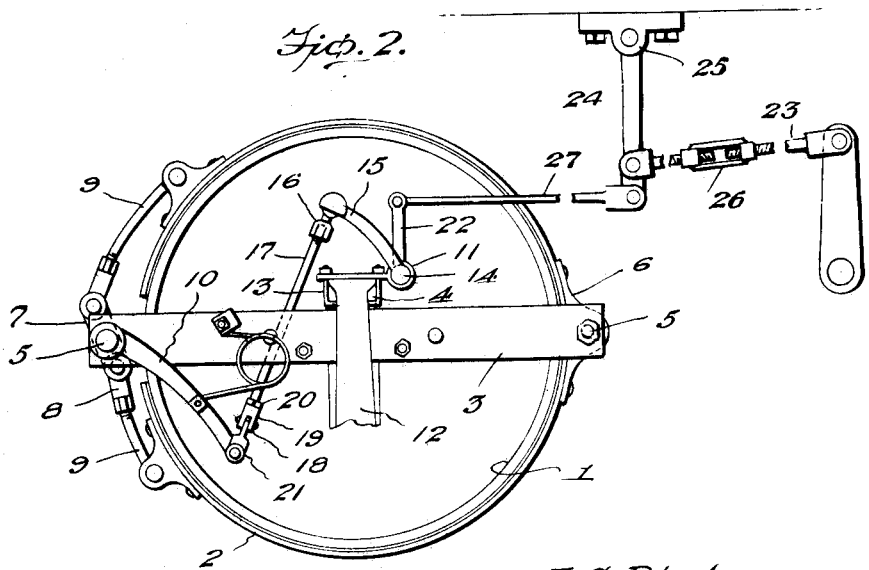
Fig. 2 is a vertical section taken in a plane parallel to the inner face of the wheel.

Fig. 2 shows one way of connecting the link 23 with the brake applying means. In this figure the said link 23 is pivotally connected to a depending rod 24 which has its upper end pivoted in a bracket 25 which is secured to the frame of the automobile. We provide a turn buckle arrangement 26 on link 23 so as to adjust the length of said link. The lower end of rod 24 pivotally supports the brake rod 27. This arrangement of parts prevents the attachments from interfering with parts underneath the car.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:

1. Brake mechanism for the steering wheel of a motor vehicle, comprising a brake drum secured to said wheel, a cross piece carried by the steering knuckle, a brake band carried by said cross piece, a crank shaft having its crank located above the steering knuckle, means for connecting said crank with the brake band for contracting and expanding said band when the shaft is rocked and means for rocking said shaft by the brake applying mechanism of the car.

2. Brake mechanism for the steering wheel of a motor vehicle, comprising a brake drum secured to said wheel, a cross bar carried by the steering knuckle, pins carried by said cross bar, a brake band having a part engaging one of said pins, a plate carried by the other pin, means for connecting said plate with the split ends of the band, an arm connected with the pin carrying the plate, a crank shaft carried by the axle and having its crank located above the steering knuckle, a socket member pivoted to the end of the crank, a rod having a spherical end engaging said socket member, a knuckle joint connecting the rod with the arm and means for rocking the shaft by the brake applying mechanism of the car.

In testimony whereof we affix our signatures.

JOSEPH C. RHODES.
GEORGE E. GUFFEY.
JAMES G. SHEEHAN.